(12) United States Patent
Korcz et al.

(10) Patent No.: US 10,700,501 B2
(45) Date of Patent: Jun. 30, 2020

(54) ADJUSTABLE MUD RING ASSEMBLY

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/384,391

(22) Filed: Apr. 15, 2019

(65) Prior Publication Data

US 2019/0312420 A1 Oct. 10, 2019

Related U.S. Application Data

(63) Continuation of application No. 15/899,098, filed on Feb. 19, 2018, now Pat. No. 10,263,403.

(Continued)

(51) Int. Cl.
*H02G 3/08* (2006.01)
*H02G 3/14* (2006.01)
*H02G 3/12* (2006.01)

(52) U.S. Cl.
CPC .............. *H02G 3/081* (2013.01); *H02G 3/121* (2013.01); *H02G 3/126* (2013.01); *H02G 3/14* (2013.01)

(58) Field of Classification Search
CPC .......... H02G 3/08; H02G 3/081; H02G 3/121; H02G 3/126; H02G 3/14; H01H 9/02; H01H 13/04

(Continued)

(56) References Cited

U.S. PATENT DOCUMENTS 5,224,673 A 7/1993 Webb
5,931,325 A 8/1999 Filipov
(Continued)

OTHER PUBLICATIONS

PCT/US2015/066212 International Search Report and Written Opinion dated Mar. 7, 2016.
(Continued)

*Primary Examiner* — Angel R Estrada
(74) *Attorney, Agent, or Firm* — Michael Best & Friedrich, LLP

(57) ABSTRACT

A mud ring assembly includes a base member, a movable member, and at least one actuator. The base member is configured to be coupled to a junction box and includes a flange, an opening extending through the flange, and at least one threaded hole extending through the flange. Each threaded hole is spaced apart from the opening. The movable member is positioned in the opening and is configured to support an electrical device. The movable member includes a first edge and a second edge. The first edge is positioned adjacent the first side of the flange and the second edge is positioned adjacent the second side of the flange. The movable member further includes at least one slot positioned proximate the first edge. Each slot is aligned with one threaded hole. The actuator includes a threaded portion, a head, and a bearing flange. Each actuator is secured in one slot by the head and the bearing flange. Each actuator is rotatable relative to the slot. The threaded portion engages one threaded hole such that rotation of the actuator changes the depth of insertion of the movable member within the opening of the base member.

19 Claims, 10 Drawing Sheets

Related U.S. Application Data

(60) Provisional application No. 62/460,309, filed on Feb. 17, 2017.

(58) Field of Classification Search
USPC ......... 174/50, 53, 57, 58, 480, 481, 496, 66; 220/3.2–3.9, 4.02, 241, 242; 248/906, 248/343; 33/528, DIG. 10
See application file for complete search history.

(56) References Cited

U.S. PATENT DOCUMENTS

| | | |
|---|---|---|
| 6,209,836 B1 | 4/2001 | Swanson |
| 6,666,419 B1 | 12/2003 | Vrame |
| 6,820,760 B2 | 11/2004 | Wegner |
| 7,025,314 B1 | 4/2006 | Thomas et al. |
| 7,038,131 B1 | 5/2006 | Gretz |
| 7,259,328 B1 | 8/2007 | Gretz |
| 7,301,099 B1 | 11/2007 | Korcz |
| 7,355,118 B1 | 4/2008 | Gretz |
| 7,468,486 B2 | 12/2008 | Yan |
| 7,531,743 B2 | 5/2009 | Johnson et al. |
| 7,645,936 B2 | 1/2010 | Magno, Jr. |
| 7,824,213 B1 | 11/2010 | Korcz |
| 8,076,577 B2 | 12/2011 | Magno, Jr. et al. |
| 8,575,484 B1 | 11/2013 | Witherbee |
| 8,680,394 B2 | 3/2014 | Korcz et al. |
| 9,553,438 B2 | 1/2017 | Korcz |
| 10,263,403 B2 * | 4/2019 | Korcz .................... H02G 3/121 |
| 2002/0157845 A1 | 10/2002 | Vrame et al. |
| 2010/0108347 A1 | 5/2010 | Korcz et al. |
| 2010/0218969 A1 | 9/2010 | Purves et al. |
| 2010/0252552 A1 | 10/2010 | Nikayin et al. |
| 2010/0270446 A1 | 10/2010 | Phillips |
| 2014/0202758 A1 | 7/2014 | Lolachi |
| 2014/0238738 A1 | 8/2014 | Korcz et al. |
| 2015/0001357 A1 | 1/2015 | Jaffari et al. |

OTHER PUBLICATIONS

PCT/US2017/020761 International Search Report and Written Opinion dated May 26, 2017.

* cited by examiner

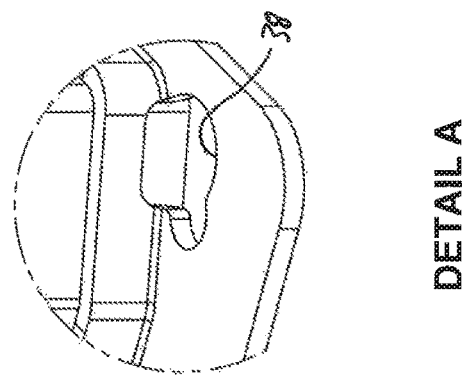
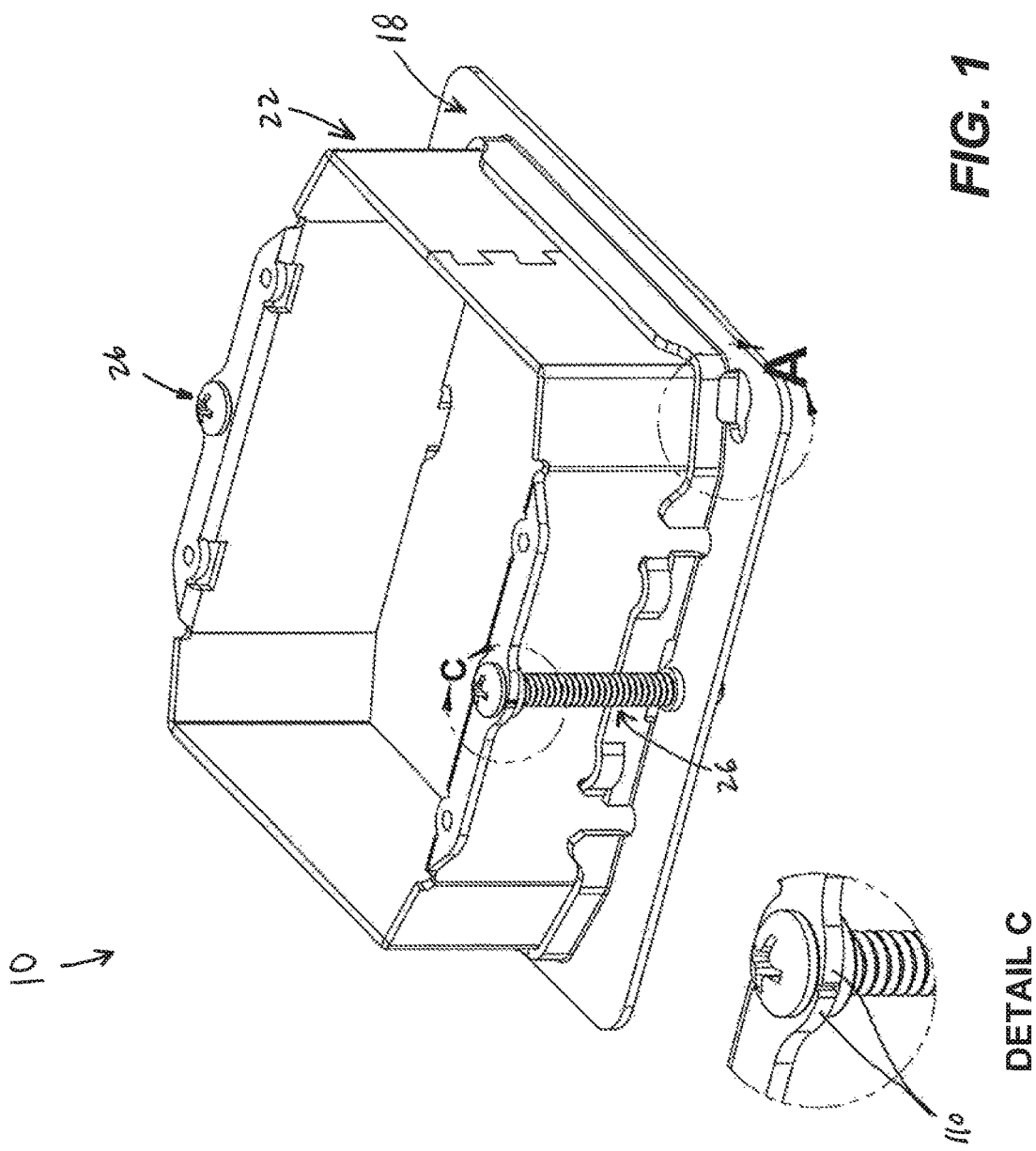
FIG. 1

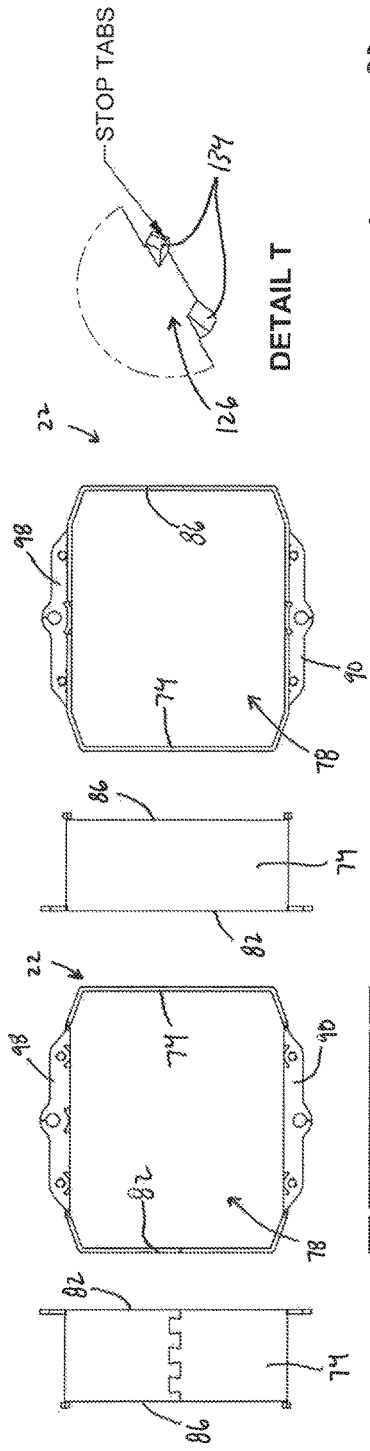
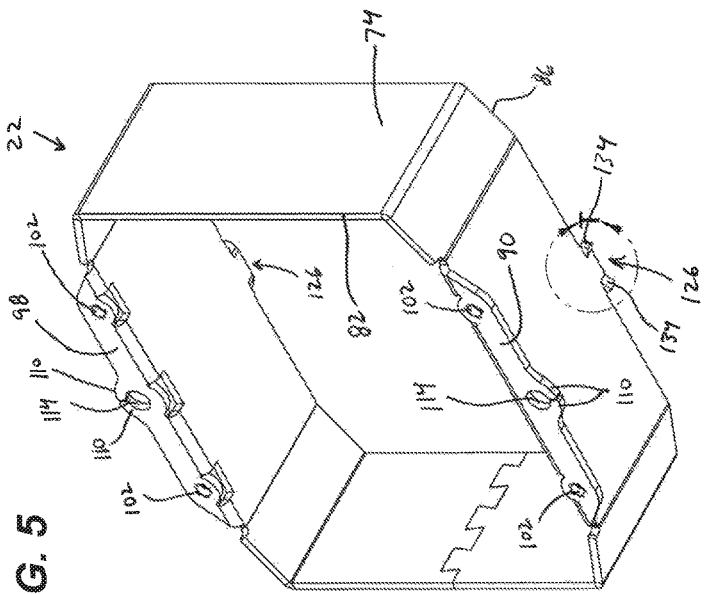
FIG. 5
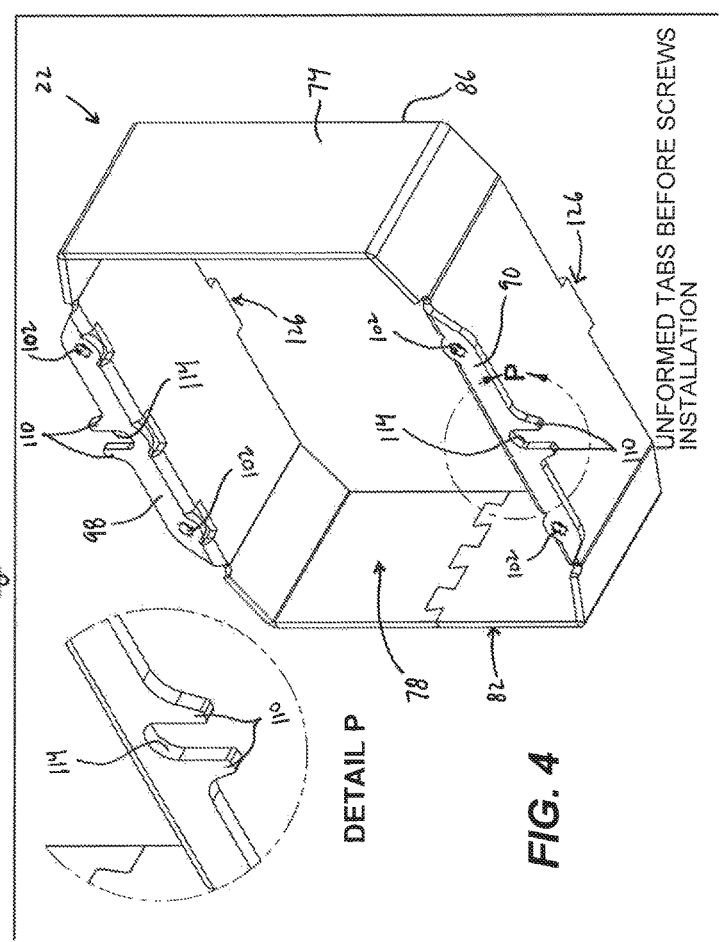
FIG. 4

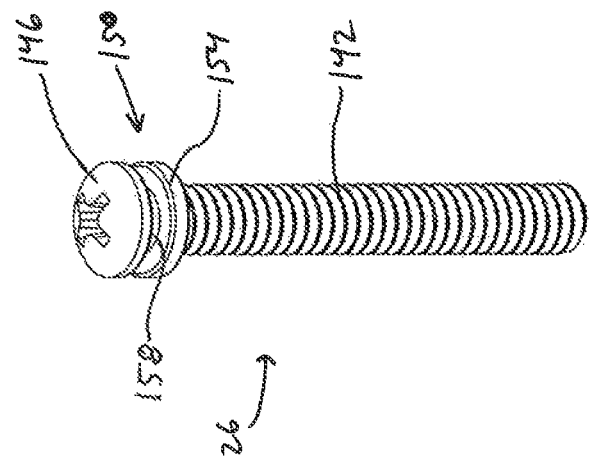
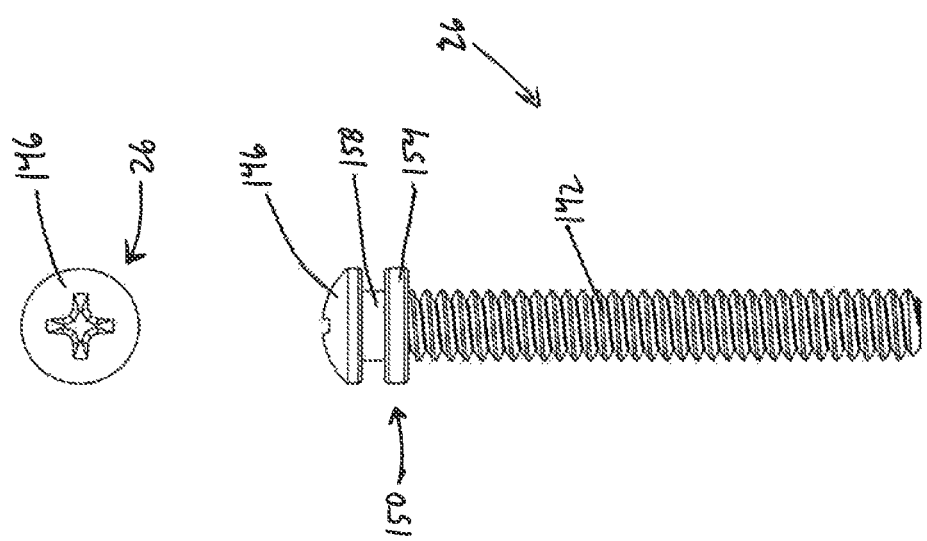
FIG. 6

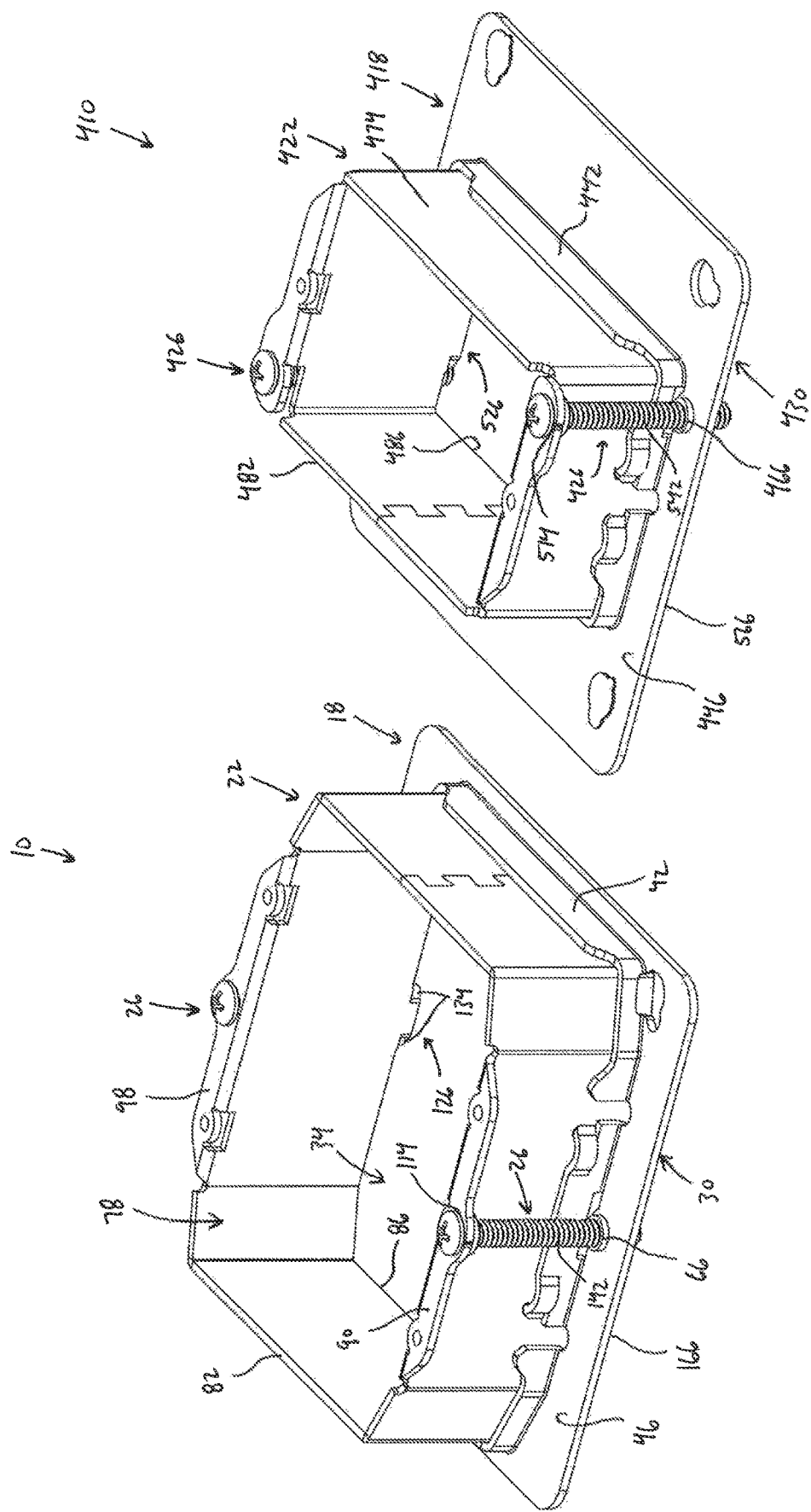

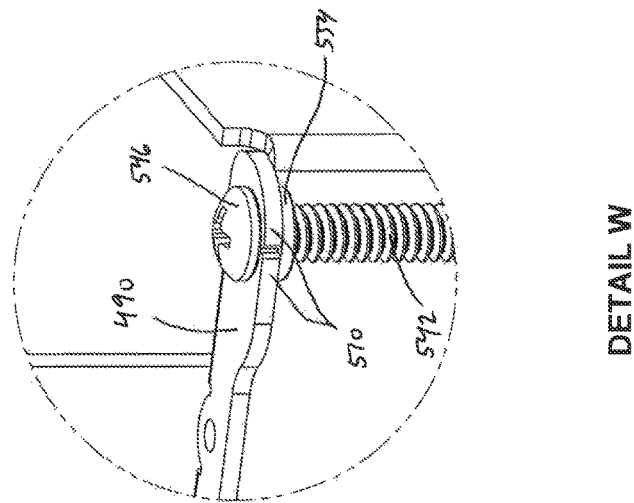
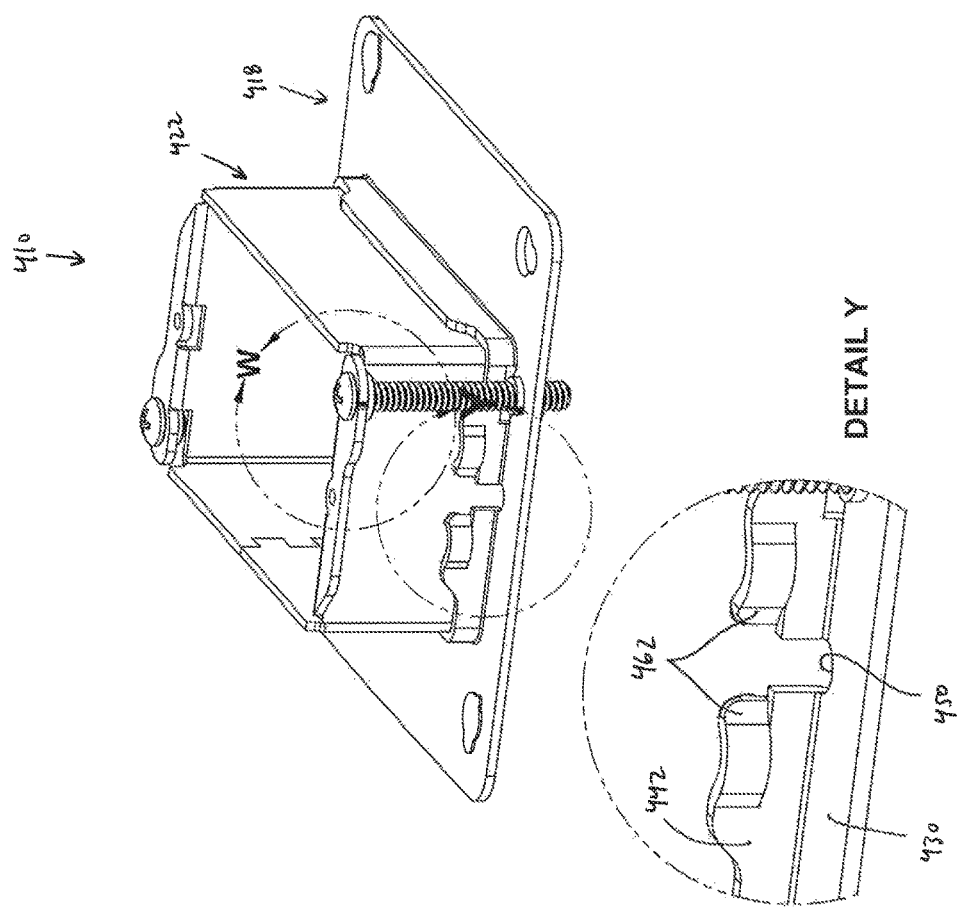
FIG. 9

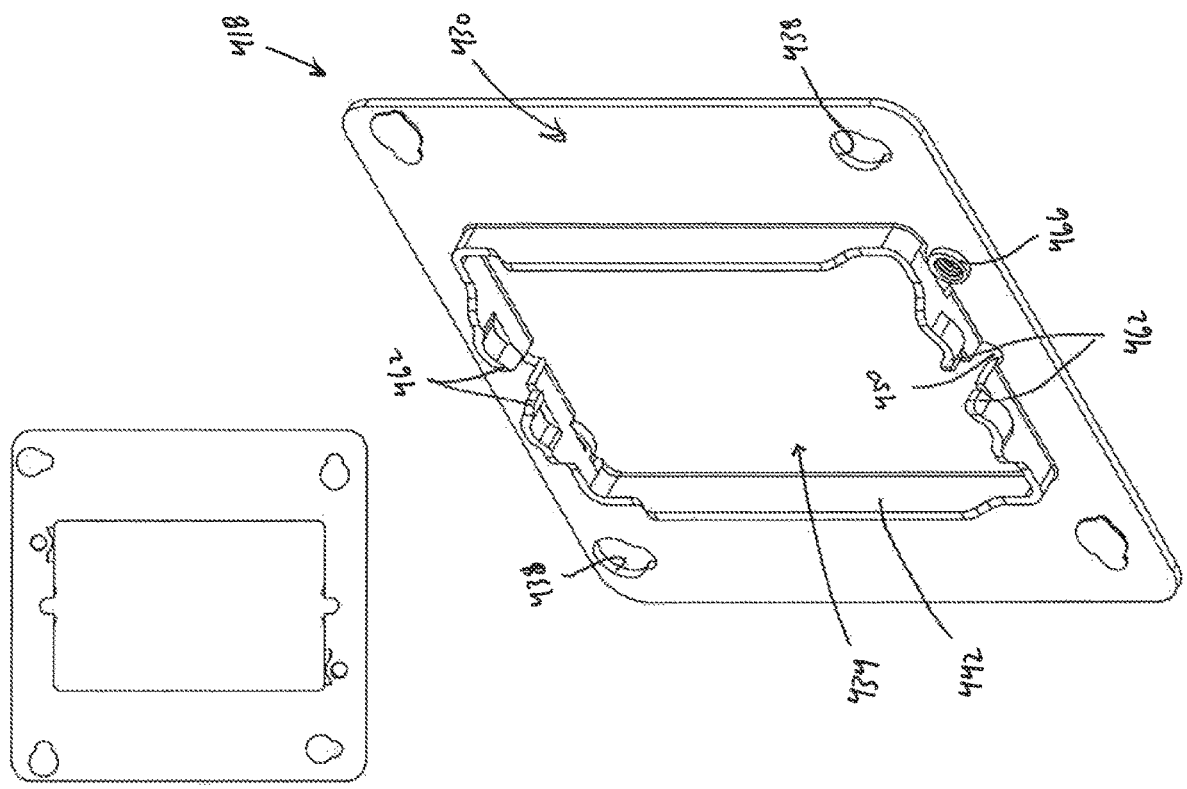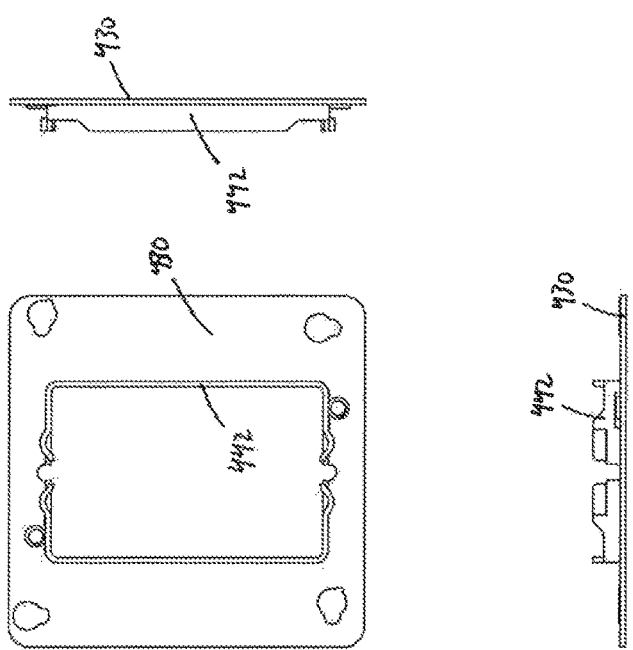
FIG. 11

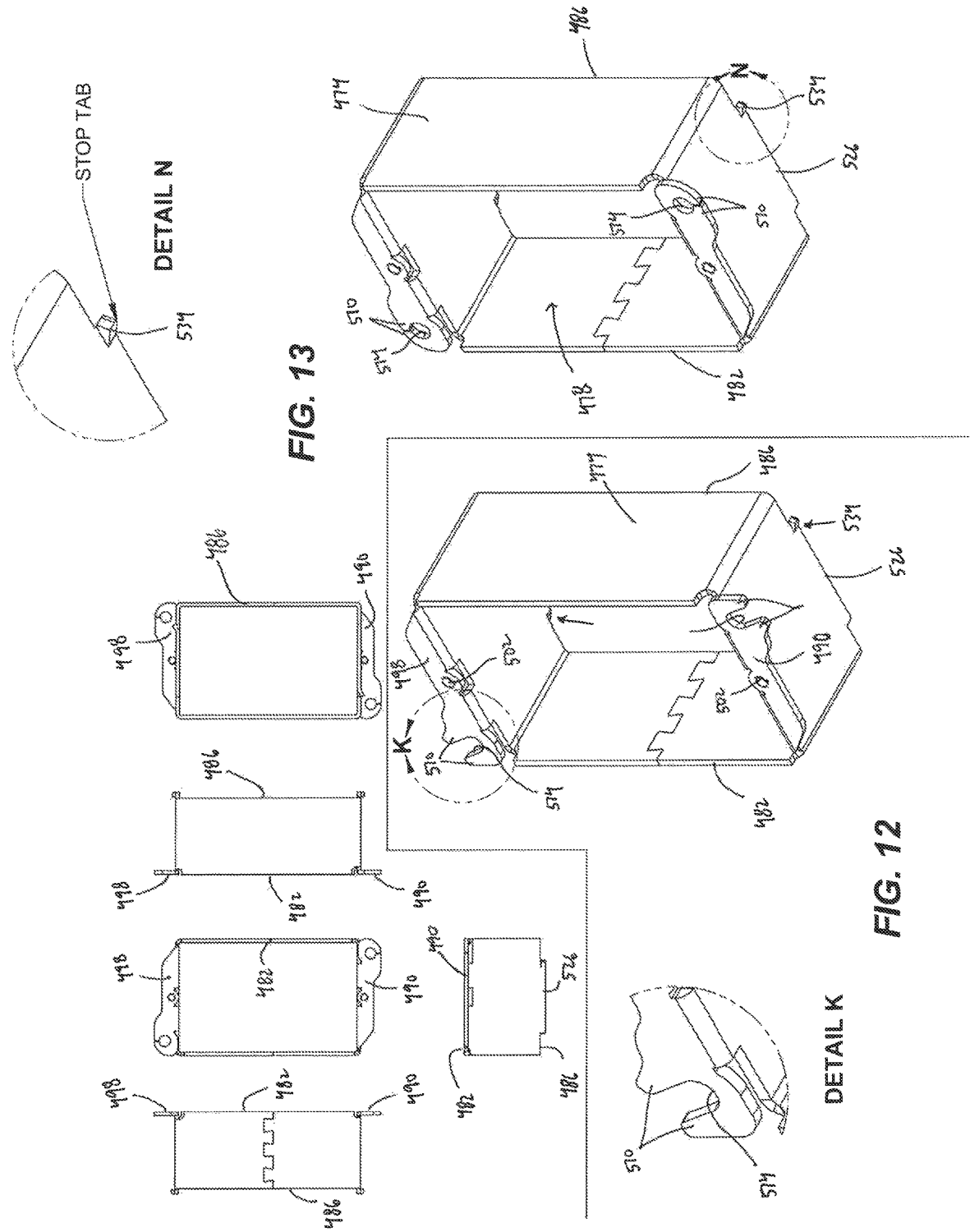

ADJUSTABLE MUD RING ASSEMBLY

CROSS-REFERENCE TO RELATED APPLICATION

This application is a Continuation of U.S. patent application Ser. No. 15/899,098, filed Feb. 19, 2018, which claims the benefit of prior-filed, U.S. Provisional Patent Application No. 62/460,309, filed Feb. 17, 2017, the entire contents of which are incorporated herein by reference.

BACKGROUND

The present disclosure relates to mud rings, and particularly to adjustable mud ring assemblies.

Electrical devices (e.g., electrical outlets, switches, and others) are typically installed in a wall or ceiling. A gang or junction box is typically secured to a stud or support beam inside the wall or ceiling. The electrical device is then secured in the box in electrical communication with one or more electrical conductors so that the electrical device extends or protrudes from the wall or ceiling. In this manner, any exposed portion of the electrical conductor and its connection to the electrical device is shielded within the box. Plaster rings, extension rings, and extenders, commonly known as mud rings, are typically attached to the box prior to the installation of sheet rock, wall board, or other covering surface material.

SUMMARY

In one aspect, a mud ring assembly for supporting an electrical device includes a base member, a movable member, and at least one actuator. The base member is configured to be coupled to a junction box and includes a flange, an opening extending through the flange, and at least one threaded hole extending through the flange. The flange has a first side and a second side. Each of the at least one threaded hole is spaced apart from the opening. The movable member is positioned in the opening and is configured to support the electrical device. The movable member includes a first edge and a second edge. The first edge is positioned adjacent the first side of the flange and the second edge is positioned adjacent the second side of the flange. The movable member further includes at least one slot positioned proximate the first edge. Each slot is aligned with one of the at least one threaded hole. The at least one actuator includes a threaded portion, a head, and a bearing flange. A portion of each actuator is secured in one of the at least one slot by the head and the bearing flange. Each actuator is rotatable relative to the slot. The threaded portion engages one of the at least one threaded hole such that rotation of the actuator changes the depth of insertion of the movable member within the opening of the base member.

In another aspect, a mud ring assembly for supporting an electrical device includes a base member, a movable member, and an actuator. The base member is configured to be coupled to a junction box. The base member includes a flange, an opening extending through the flange, and a threaded hole extending through the flange. The flange has a first side and a second side. The threaded hole is spaced apart from the opening. The movable member is positioned in the opening. The movable member is configured to support the electrical device. The movable member includes a first edge and a second edge. A flange portion protrudes laterally from the first edge and away from the opening. The flange portion is spaced apart from the first side, and the flange portion includes a slot aligned with the threaded hole. The actuator includes a threaded portion, a head, and a bearing flange. A portion of the actuator between the head and the bearing flange is secured in the slot. The actuator is rotatable relative to the slot. The threaded portion engages the threaded hole such that rotation of the actuator changes the depth of insertion of the movable member within the opening of the base member.

The above-described and other features and advantages of the present disclosure will be appreciated and understood by those skilled in the art from the following detailed description and drawings.

BRIEF DESCRIPTION OF THE DRAWINGS

FIG. 1 is a perspective view of a mud ring assembly.

FIG. 4 is a perspective view of a movable member with tabs in a first position.

FIG. 5 includes plan, elevation, and perspective views of the movable member of FIG. 4 with the tabs in a second position.

FIG. 6 includes plan, elevation, and perspective views of an actuator.

FIG. 7 is a perspective view of the mud ring assembly of FIG. 1.

FIG. 8 is a perspective view of a mud ring assembly according to another embodiment.

FIG. 9 is perspective view of the mud ring assembly of FIG. 8.

FIG. 11 includes plan, elevation, and perspective views of a base member according to another embodiment.

FIG. 12 is a perspective view of an movable member according to another embodiment, with tabs in a first position.

FIG. 13 includes plan, elevation, and perspective views of the movable member of FIG. 12 with the tabs in a second position.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 2:
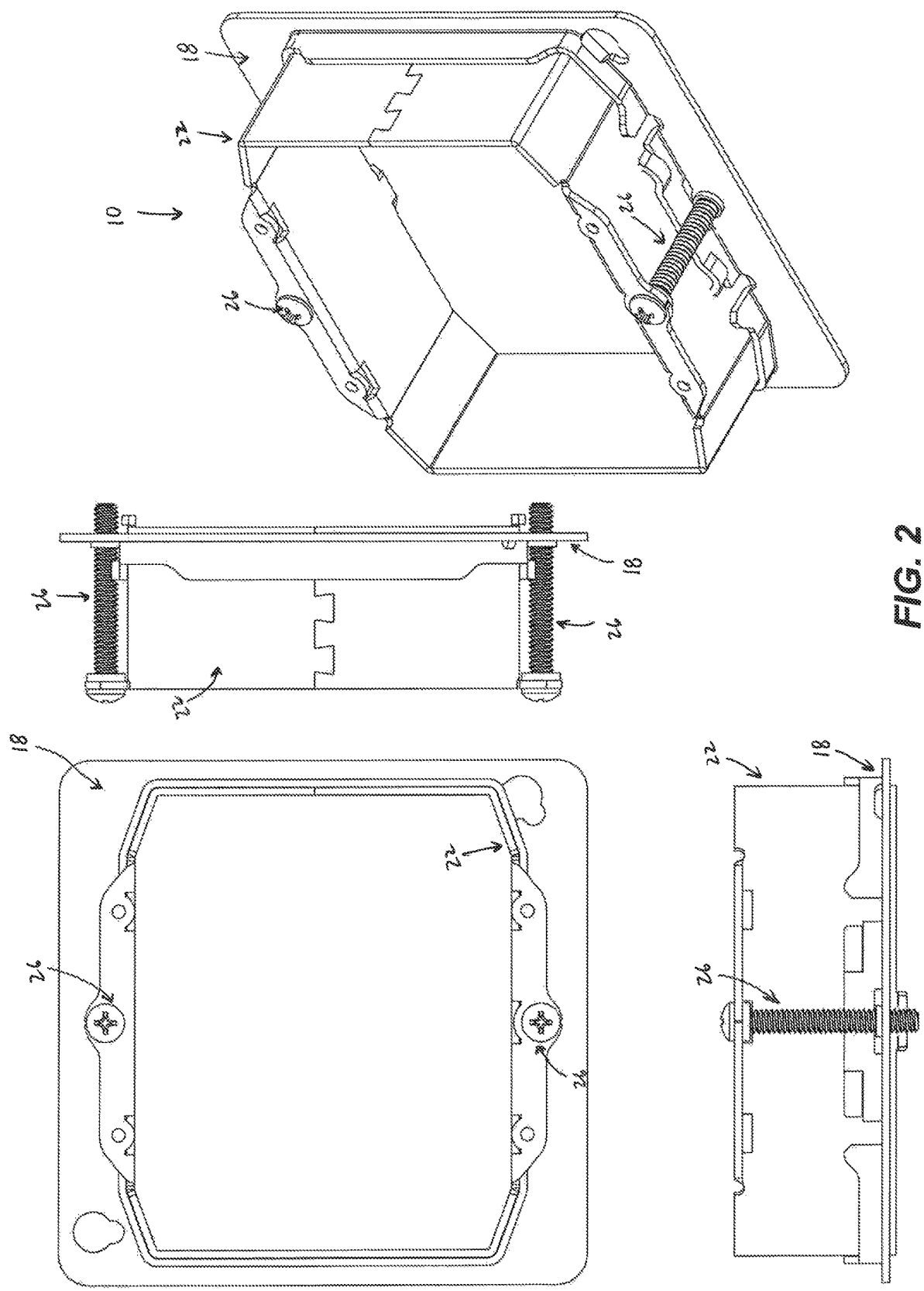
FIG. 2 includes plan, elevation, and perspective views of the mud ring assembly of FIG. 1.

FIGS. 1 and 2 illustrate a mud ring assembly 10 according to one embodiment. The mud ring assembly 10 includes a first portion or base member 18, a second portion or movable member 22, and actuators 26 extending between the base member 18 and the movable member 22. In the illustrated embodiment, the mud ring assembly 10 includes a pair of actuators 26; in other embodiments, the mud ring assembly 10 may include fewer or more actuators 26. The mud ring assembly 10 may be coupled to a junction box (not shown) positioned in a wall or ceiling and may support one or more electrical devices including, but not limited to, an electric outlet (not shown). In the embodiment of FIGS. 1-7, the mud ring assembly 10 is a double gang mud ring assembly for supporting a pair of electrical devices. In other embodiments (e.g., shown in FIGS. 8-13), the mud ring assembly 410 may be a single gang mud ring assembly for supporting a single electrical device.

Figure 3:
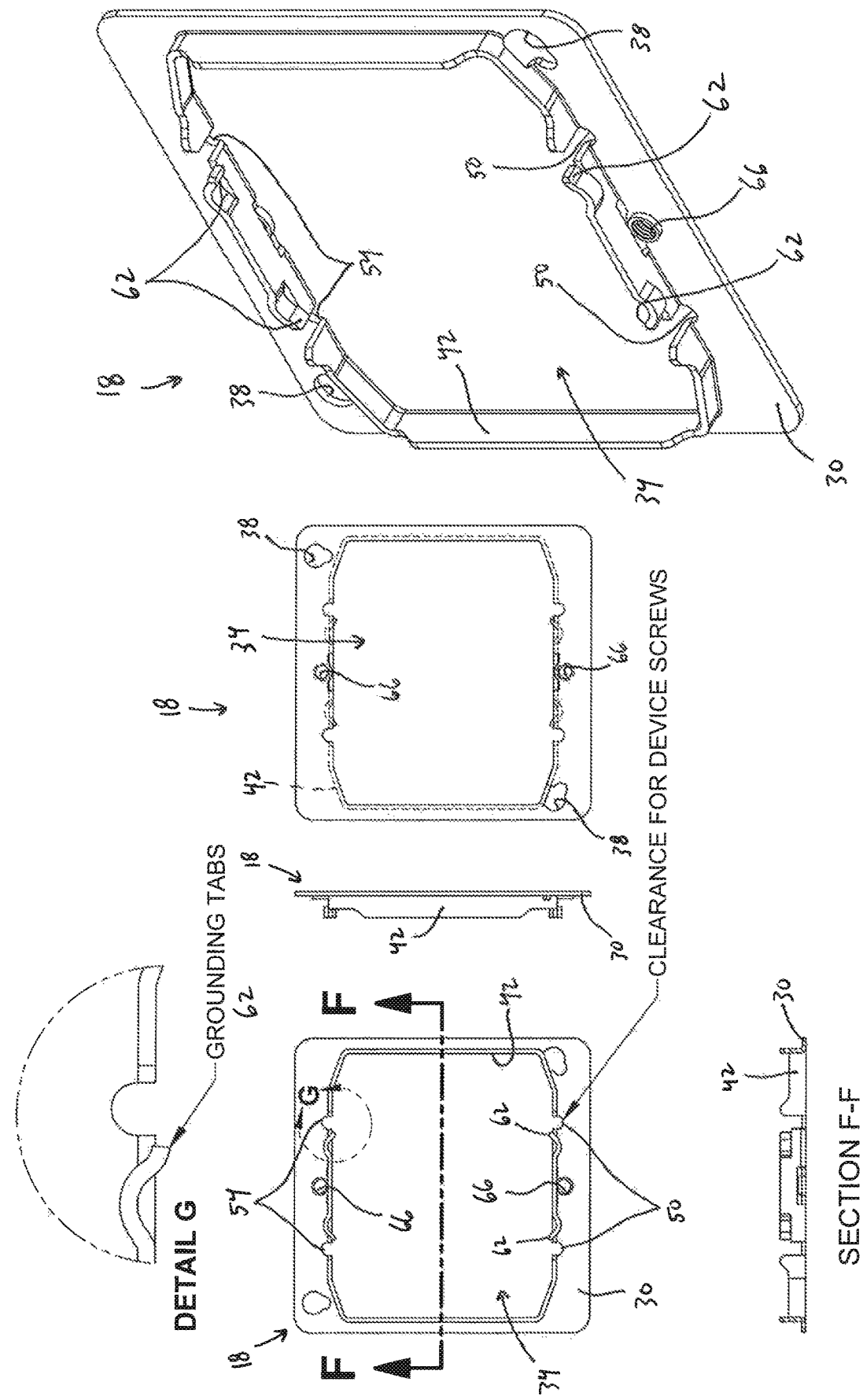
FIG. 3 includes plan, elevation, and perspective views of a base member.
Figure 10:
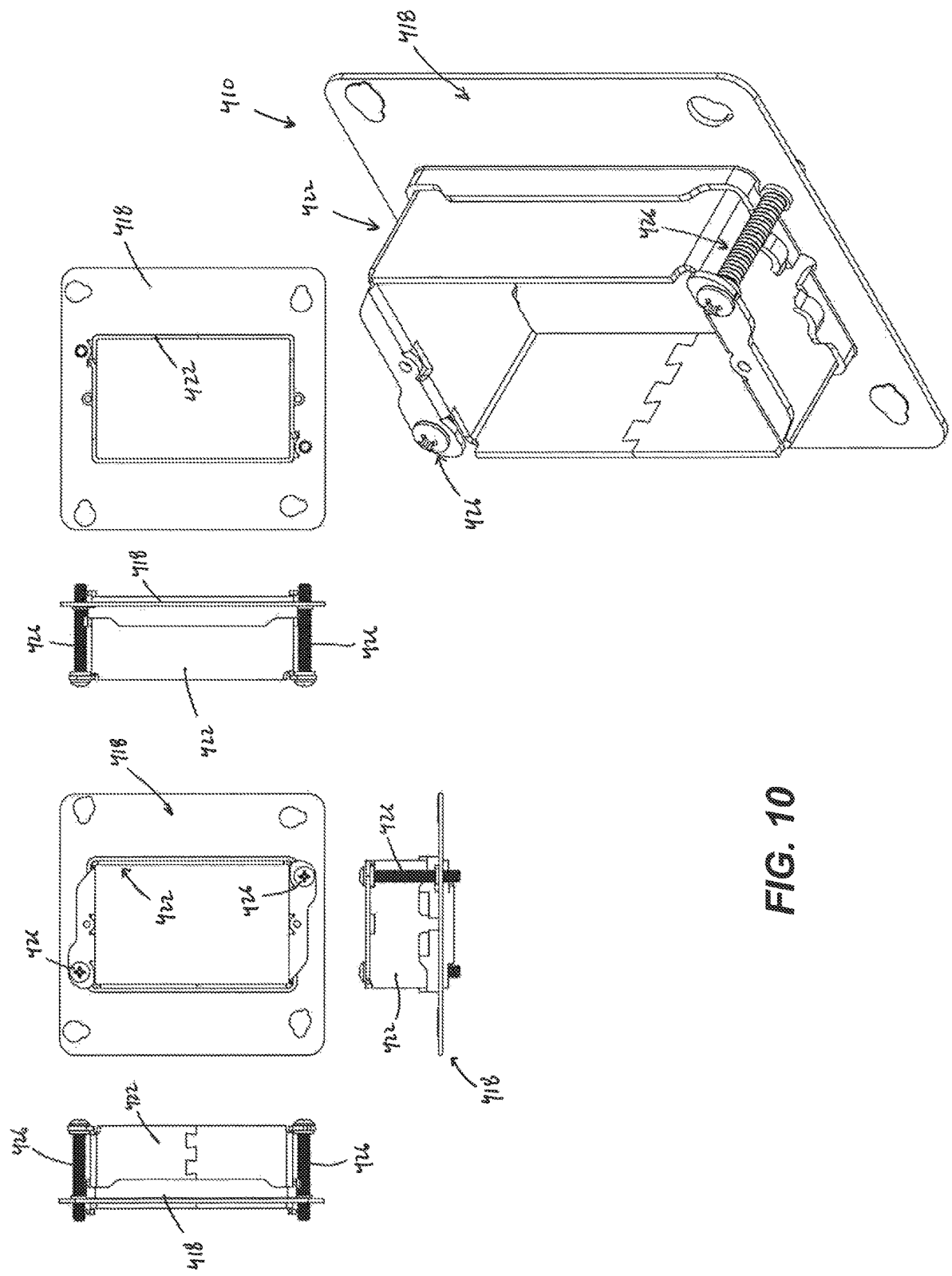
FIG. 10 includes plan, elevation, and perspective views of the mud ring assembly of FIG. 8.

As shown in FIG. 3, the base member 18 includes a planar flange 30 enclosing an opening 34. The planar flange 30 further includes slots 38 (e.g., keyhole slots) for coupling the base member 18 to a junction box. The base member 18 further includes an opening peripheral portion or ring 42 projecting from a first side 46 of the planar flange 30 and extending substantially along the perimeter of the opening 34. A first pair of apertures 50 is positioned along one portion of the ring 42 and a second pair of apertures 54 is positioned on an opposite portion of the ring 42. The apertures 50 provide clearance spaces for fasteners or screws of the electrical devices (not shown) positioned in the mud ring assembly 10. The ring 42 also includes grounding tabs 62 extending inwardly toward the opening 34. The grounding tabs 62 are positioned to engage or contact the movable member 22 (FIG. 2) to prevent any buildup of electricity in the movable member 22.

The base member 18 further includes threaded holes 66 extending through the planar flange 30. In the illustrated embodiment, the base member 18 includes a pair of threaded holes 66, and the threaded holes 66 are positioned on opposite sides of the opening 34 from one another. The threaded holes 66 may be positioned between the apertures 50, 54. In other embodiments, the base member 18 may include fewer or more threaded holes 66, and/or the threaded holes 66 may be positioned in a different manner.

As shown in FIGS. 4 and 5, the movable member 22 may be formed as a closed wall 74 extending around an enclosed space 78. The wall 74 is dimensioned to fit within the opening 34 (FIG. 3) of the base member 18. In the illustrated embodiment, the movable member 22 includes a first edge 82 and a second edge 86. A first flange 90 is positioned on one side of the wall 74 is generally coplanar with the first edge 82. The first flange 90 protrudes from the wall 74 in a direction away from the enclosed space 78. A second flange 98 is positioned on another side of the wall 74 opposite the side to which the first flange 90 is connected. The second flange 98 is generally coplanar with the first edge 82 and the first flange 90, and the second flange 98 protrudes from the wall 74 in a direction away from the enclosed space 78. Each of the first flange 90 and the second flange 98 includes a pair of openings 102 for receiving a fastener coupled to an electrical device (not shown), and a pair of protrusions 110 forming a slot 114 therebetween. As shown in FIG. 4, the protrusions 110 form an open-ended slot in an initial configuration. However, as shown in FIG. 5, the protrusions 110 may be deflected toward each other to enclose the slot 114 after the actuator 26 is positioned in the slot 114. In other embodiments, the movable member 22 may include fewer or more flanges 90, 98, and/or the first flange 90 and the second flange 98 may be positioned in a different manner.

In addition, two tabs 126 protrude from the second edge 86 of the wall 74. In the illustrated embodiment, one of the tabs 126 is connected to the same side of the wall 74 as the first flange 90, and the other tab 126 is connected to the same side of the wall 74 as the second flange 98. In an initial configuration (FIG. 4) the tabs 126 are formed to be coplanar with their respective side of the wall 74. However, as shown in FIG. 5, end portions 134 of each tab 126 may be bent or deflected outwardly such that the end portions 134 protrude in a direction away from the enclosed space 78.

FIG. 6 illustrates one of the actuators 26 extending between the base member 18 and the movable member 22. In the illustrated embodiment, the actuator 26 is a fastener including a threaded shank 142, a head 146, and a bearing portion 150 positioned between the head 146 and the threaded shank 142. The bearing portion 150 includes a bearing flange 154 positioned adjacent an end of the threaded shank 142 and a cylindrical surface 158 formed between the bearing flange 154 and the head 146. The cylindrical surface 158 is positioned in the slot 114 of the first flange 90 and the protrusions 110 may then be deflected around the cylindrical surface 158. The head 146 and the bearing flange 154 prevent the actuator 26 from being removed from the slot 114 (see enlarged area in FIG. 1) in a direction along the longitudinal axis of the actuator 26, while the protrusions 110 prevent the actuator 26 from being laterally removed from the slot 114. A similar actuator 26 may be positioned in the slot 114 of the second flange 98.

As shown in FIG. 7, the movable member 22 is positioned within the opening 34 of the base member 18 such that the first edge 82 of the wall 74 is positioned adjacent the ring 42 and the first side 46 of the planar flange 30, and such that the second edge 86 of the wall 74 is positioned adjacent the second side 166 of the planar flange 30. In addition, the slot 114 of the first flange 90 is aligned with one of the threaded holes 66 of the base member 18, and the threaded shank 142 of one of the actuators 26 is threaded into the threaded hole 66. Similarly, the slot 114 of the second flange 98 is aligned with the other of the threaded holes 66, and the threaded shank 142 of the other actuator 26 is threaded into the threaded hole 66. The end portions 134 of the tabs 126 of the movable member 22 extend away from the enclosed space 78 and are positioned to contact the second side 166 of the planar flange 30, thereby providing a mechanical stop to prevent the movable member 22 from being completely removed from the opening 34 of the base member 18.

During installation, an operator can rotate the actuators 26 to thread or unthread the threaded shanks 142 relative to the threaded holes 66, thereby changing the position of the movable member 22 relative to the base member 18. In this manner, the operator may adjust the depth of the movable member 22 as necessary to accommodate various wall thicknesses.

FIGS. 8-13 illustrate a mud ring assembly 410 according to another embodiment. The mud ring assembly 410 is similar to the mud ring assembly 10 described above with respect to FIGS. 1-7, and for the sake of brevity only differences will be described in detail. Similar features are identified with similar reference numbers, plus 400.

The mud ring assembly 410 is a single gang mud ring assembly for supporting a single electrical device (not shown). As shown in FIGS. 8-11, the base member 418 includes a pair of threaded holes 466 positioned adjacent opposite corners of the opening 434. Similarly, the slot 514 of the first flange 490 of the movable member 422 is positioned adjacent a corner of the wall 474, while the slot 514 of the second flange 498 is positioned adjacent an opposite corner. Furthermore, each of the first flange 490 and the second flange 498 includes a single opening 502 for receiving a fastener of the electrical device (not shown). In addition, only one end portion 534 of tab 526 is deflected to contact the second side 566 of the planar flange 430.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A mud ring assembly for supporting an electrical device, the mud ring assembly comprising:
   a base member configured to be coupled to a junction box, the base member including a flange having a first side and a second side, the base member further including an opening extending through the flange;
   a movable member positioned in the opening and configured to support the electrical device, the movable member including a first end and a second end, the first end positioned adjacent the first side of the flange and the second end positioned adjacent the second side of the flange;
   a threaded hole positioned on one of the base member and the movable member; and
   an actuator including a threaded portion engaging the threaded hole, the actuator secured against translational movement relative to the other of the base member and the movable member, the actuator being rotatable relative to the other of the base member and the movable member, rotation of the actuator causing the movable member to move and change a depth of insertion of the movable member within the opening of the base member.

2. The mud ring assembly of claim 1, wherein the actuator including a flange engaging a surface of the other of the base member and the movable member to secure the actuator against translational movement while permitting the actuator to rotate freely.

3. The mud ring assembly of claim 1, wherein the threaded hole is positioned on the base member, and wherein the movable member includes a slot aligned with the threadead hole and supporting the actuator.

4. The mud ring assembly of claim 1, wherein the base member further includes a peripheral portion protruding from the first side of the flange and extending substantially along a perimeter of the opening.

5. The mud ring assembly of claim 4, wherein the peripheral including a plurality of grounding tabs contacting an outer surface of the movable member.

6. The mud ring assembly of claim 1, wherein the movable member further includes a tab positioned adjacent the second end, the tab including end portions for contacting the flange to prevent movement of the movable member relative to the base member in a first direction beyond a predetermined distance.

7. The mud ring assembly of claim 1, wherein the threaded hole is a first threaded hole and the actuator is a first actuator, the mud ring assembly further comprising a second threaded hole positioned on the one of the base member and the movable member, and a second actuator including a threaded portion engaging the second threaded hole.

8. The mud ring assembly of claim 7, wherein the first threaded hole and the second threaded hole are positioned on opposite sides of the opening of the base member.

9. The mud ring assembly of claim 1, wherein the movable member includes a flange supporting the actuator, the actuator secured against translational movement relative to the flange of the movable member and freely rotatable.

10. The mud ring assembly of claim 9, wherein the flange of the movable member is a first flange, the movable member further including a second flange supporting a second actuator, the first flange and the second flange oriented perpendicularly relative to the first end, the first flange and the second flange protruding in opposite directions relative to one another.

11. A mud ring assembly for supporting an electrical device, the mud ring assembly comprising:
    a base member configured to be coupled to a junction box, the base member including a flange having a first side and a second side, the base member further including an opening extending through the flange;
    a movable member positioned in the opening and configured to support the electrical device, the movable member including a first end and a second end, the first end positioned adjacent the first side of the flange and the second end positioned adjacent the second side of the flange;
    a threaded hole positioned on the base member; and
    an actuator including a threaded portion engaging the threaded hole, the actuator including a flange engaging a portion of the movable member to secure the actuator against translational movement relative to the movable member, the actuator freely rotatable relative to the movable member, rotation of the actuator causing the movable member to move and change a depth of insertion of the movable member within the opening of the base member.

12. The mud ring assembly of claim 11, wherein the movable member includes a slot aligned with the threadead hole and supporting the actuator.

13. The mud ring assembly of claim 11, wherein the base member further includes a peripheral portion protruding from the first side of the flange and extending substantially along a perimeter of the opening.

14. The mud ring assembly of claim 13, wherein the peripheral including a plurality of grounding tabs contacting an outer surface of the movable member.

15. The mud ring assembly of claim 11, wherein the movable member further includes a tab positioned adjacent the second end, the tab including end portions for contacting the flange to prevent movement of the movable member relative to the base member in a first direction beyond a predetermined distance.

16. The mud ring assembly of claim 11, wherein the threaded hole is a first threaded hole and the actuator is a first actuator, the mud ring assembly further comprising a second threaded hole positioned on the base member, and a second actuator including a threaded portion engaging the second threaded hole.

17. The mud ring assembly of claim 16, wherein the first threaded hole and the second threaded hole are positioned on opposite sides of the opening of the base member.

18. The mud ring assembly of claim 11, wherein the movable member includes a flange supporting the actuator, the actuator secured against translational movement relative to the flange of the movable member.

19. The mud ring assembly of claim 18, wherein the flange of the movable member is a first flange, the movable member further including a second flange supporting a second actuator, the first flange and the second flange oriented perpendicularly relative to the first end, the first flange and the second flange protruding in opposite directions relative to one another.

\* \* \* \* \*